United States Patent [19]

Fellers

[11] 4,089,455

[45] May 16, 1978

[54] APPARATUS AND METHOD FOR CONNECTING PIPES BY WELDING

[75] Inventor: Gary A. Fellers, Montrose, Scotland

[73] Assignee: HydroTech International, Inc., Houston, Tex.

[21] Appl. No.: 790,464

[22] Filed: Apr. 25, 1977

[51] Int. Cl.² .............................................. B23K 31/06
[52] U.S. Cl. .................................... 228/178; 228/119; 285/31; 285/184; 285/286
[58] Field of Search ...................... 228/119, 178, 219; 285/31, 184, 286

[56] References Cited

U.S. PATENT DOCUMENTS

| 1,700,319 | 1/1929 | Kjekstad | 285/286 |
|---|---|---|---|
| 2,209,325 | 7/1940 | Dennis | 285/286 X |
| 3,186,431 | 6/1965 | Moore | 285/286 X |
| 3,737,179 | 6/1973 | White, Jr. | 285/184 X |
| 3,876,852 | 4/1975 | Topham | 228/219 X |

FOREIGN PATENT DOCUMENTS

| 2,325,757 | 12/1973 | Germany | 285/184 |

*Primary Examiner*—Al Lawrence Smith
*Assistant Examiner*—K. J. Ramsey
*Attorney, Agent, or Firm*—James A. Bargfrede

[57] ABSTRACT

Apparatus and method for connecting by welding two axially spaced apart pipes which may be misaligned relative to each other, including butt welding between the pipe ends a pair of coupling members, each coupling member having a tubular portion and an end portion having a face which lies on a plane which intersects the axis of the tubular portion at a nonperpendicular angle and which describes the circle upon the plane. The faces of the end portions may be abutted, rotated, and welded together such that the axes of the tubular portions thereof intersect at various angles. In one embodiment of the invention, the coupling members are mounted in combination with a pair of tubes, each of the tubes has a radially enlarged ring near one end thereof, which end is butt welded to one of the pipe ends. The coupling members are slidingly mounted over the tubes in telescopic fashion, and fixed upon the tubes by fitting a split sleave over the tube between the ring thereon and the end of the tubular portion of the coupling member, which is then butt welded in place. In an alternate embodiment of the invention, the coupling members are mounted between the pipe ends by butt welding the tubular portions directly to the pipe ends. The apparatus and method of this invention are particularly useful for use in an underwater environment.

4 Claims, 4 Drawing Figures

APPARATUS AND METHOD FOR CONNECTING PIPES BY WELDING

BACKGROUND OF THE INVENTION (a) Field of the Invention

This invention relates to an apparatus and method for connecting pipes. More particularly, this invention relates to an apparatus and method for connecting axially spaced apart relatively misaligned pipe ends by welding.

(b) Description of the Prior Art

The methods of connecting pipes usually involve using either mechanical pipe coupling tools or welding. connections are accomplished either by butt welding the pipe ends directly to each other or by sliding mateable coupling members over the pipes and welding the members together.

Neither method of connecting pipes by welding is entirely satisfactory in all situations. In order to butt weld the pipes directly to each other, the ends thereof must be brought into abuttment in substantially perfect axial alignment. This requires the use of massive alignment equipment. With coupling members, some misalignment is tolerable, therefore eliminating the need for massive alignment equipment; however, these coupling members are joined to the pipes and to each other by fillet welds, which are inherently inferior to butt welds.

SUMMARY OF THE INVENTION

It is therefore an object of this invention to provide apparatus and method by which relatively misaligned pipes may be butt welded together.

Briefly stated, the apparatus and method of this invention involve the use of a pair of coupling members each having a tubular portion and an end portion with an annular face lying on a plane which intersects the axis of the tubular portion at a minor angle at less than 90°, and which describes a circle upon the plane. The end portion is most conveniently of a spherical cross-sectional configuration so that a circle will be described upon any plane passing therethrough. However, the end portion does not need in all cases to be of spherical cross-section: other cross-sections will suffice, so long as the face thereof is circular. By having such circular faced end portion, a pair of such couplings may be abutted and rotated relative to each other, and be butt welded together. By having the face lie on the plane not perpendicular to the axis of the tubular portion, the coupling members may be joined together at an angle of up to twice the angle by which the plane on which the face lies varies from the perpendicular.

In one embodiment of the invention, the coupling members are adapted to be slid axially over a pair of tubes, each of which has a radially outwardly enlarged ring near one end thereof. Each tube is adapted to be butt welded generally coaxially to one of the pipe ends. The ring serves as an anchor for one end of an axially split sleeve which is fitted over the tube and occupies the space between the ring and the end of the tubular portion of the coupling member. After the coupling members have been butt welded together, the split sleeves are installed and butt welded at one end to the ring and at the other end to the coupling member thereby completing the pipe connection.

In an alternate embodiment of the invention, the coupling members are abutted and rotated relative to each other until the angle at which the axes of the end portion thereof intersect is equal to the angle at which the axes of the pipes to be connected intersect, and then butt welded together. The coupling members are then inserted between and butt welded coaxially with, and directly to, the pipe ends.

DESCRIPTION OF THE PREFERRED EMBODIMENT

Figure 1:
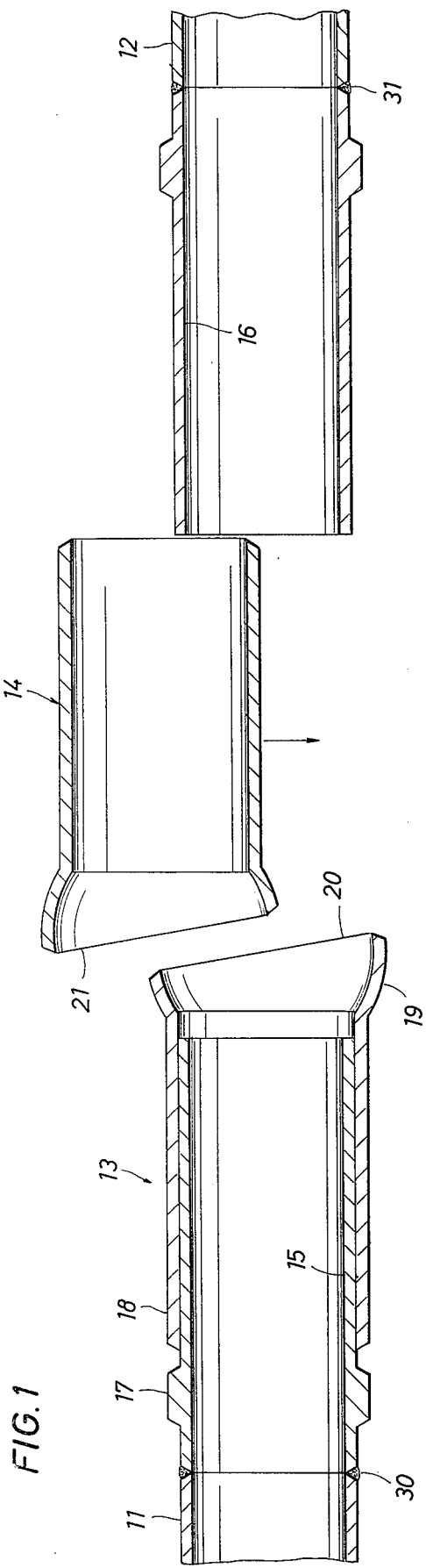
FIG. 1 is a longitudinal central sectional view of one embodiment of the invention showing both tubular members welded in place, with one coupling mounted and the other coupling in position to be mounted.
Figure 2:
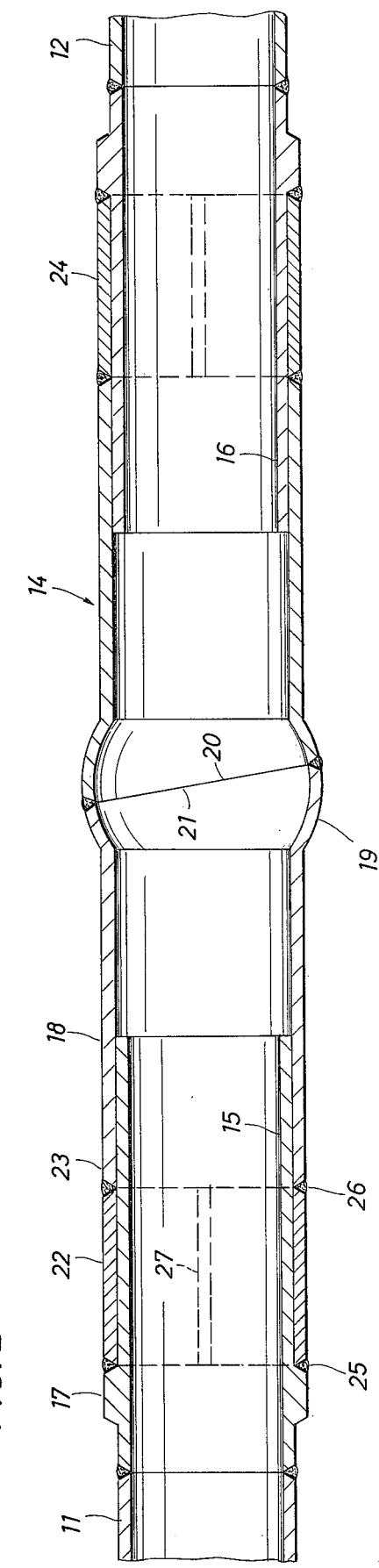
FIG. 2 is a view similar to FIG. 1, but showing both coupling members mounted and welded in place.

Referring now to FIGS. 1 and 2 of the drawings, the apparatus of the preferred embodiment of the invention is comprised generally of a pair of coupling members, designated generally by the numerals 13 and 14, adapted to be slidingly mounted in telescopic fashion over a pair of tubes 15 and 16, each of which is adapted to be butt welded to one of a pair of pipe ends 11 and 12 as by weldments 30 and 31. Coupling member 13 is substantially identical to coupling member 14. Similarly tube 15 is substantially identical to tube 16. Accordingly, descriptions of one of either pair will apply to the other of the pair.

Coupling member 13 is comprised of tubular portion 18 which flares into a hemispherical end portion 19. End portion 19 terminates at a face 20, which lies on a plane intersecting the axis of tubular portion 18 at an angle not equal to 90°. Since end portion 19 is of spherical cross-section, the intersection thereof with any plane passing therethrough defines a circle. Accordingly, face 20 is circular. The circularity achieved by the use of spherical end portion 19 makes it possible for face 20 of coupling member 13 and face 21 of coupling member 14 to be perfectly abutted, and therefor capable of being butt welded together, no matter how coupling members 13 and 14 are rotated in this respect to each other. Coupling members 13 and 14 may thus be welded together such that the axes thereof intersect each other throughout a range of angles varying from 0, as shown in FIGS. 1 and 2, to an angle equal to twice the angle by which the plane upon which face 20 lies differs from perpendicular. It is contemplated that the angle by which the plane upon which face 20 lies would differ from the perpendicular would be on the order of 10° to 15°. Accordingly, the axes of coupling members 13 and 14 may be made to intersect at angles up to 20° to 30°. It should be noted that end portion 19 may be of cross-sections other than spherical, so long as face 20 thereof is circular.

Coupling members 13 and 14 are mounted between pipe ends 11 and 12 by means of tubes 15 and 16. Tube 15 is a section of pipe having inside and outside diameters substantially equal to those of pipe 11 and therefore is adapted for butt welding thereto. The outside diameter of tube 15 is such that tubular portion 18 may be slid thereover and rotated thereabout in telescopic fashion.

Coupling member 13 is fixed upon tube 15 by means of anchor ring 17 and an axially split sleeve 22. Anchor ring 17 is a radially enlarged portion of tube 15 located near a junction of tube 15 and pipe 11 and having an outside diameter substantially equal to that of tubular portion 18. Sleeve 22 is a section of pipe axially split into two halves, each of which is adapted to be fitted over tube 15 between anchor ring 17 and an end 23 of tubular portion 18. Sleeve 22 has an inside and an outside diameter substantially equal to those portion 18 and is therefore capable of being butt welded between anchor ring 17 and end 23.

In order to use the method of this embodiment, pipe ends 11 and 12 are aligned with respect to each other such that the axes thereof generally intersect at a point approximately half way between pipe ends 11 and 12. With pipe ends 11 and 12 so positioned, the end of tube 15 which anchor ring 17 is located is butt welded generally coaxially to pipe end 11. Tube 16 is similarly butt welded to pipe end 12. With tubes 15 and 16 in place, tubular portion 18 is slidingly mounted over tube 15 and moved into general abuttment with anchor ring 17. Coupling member 14 is then similarly mounted over tube 16 in telescopic manner. Coupling members 13 and 14 are then rotated relative to each other until the planes in which faces 20 and 21 lie are parallel to each other. When the planes are parallel, coupling members 13 and 14 are slid toward each other until faces 20 and 21 are in abutting relationship. Faces 20 and 21 are then butt welded together. The connection is completed by placing split sleeves 22 and 24 over tubes 15 and 16 respectively and making annular butt welds 25 and 26, and longitudinal butt welds 27.

Figure 3:
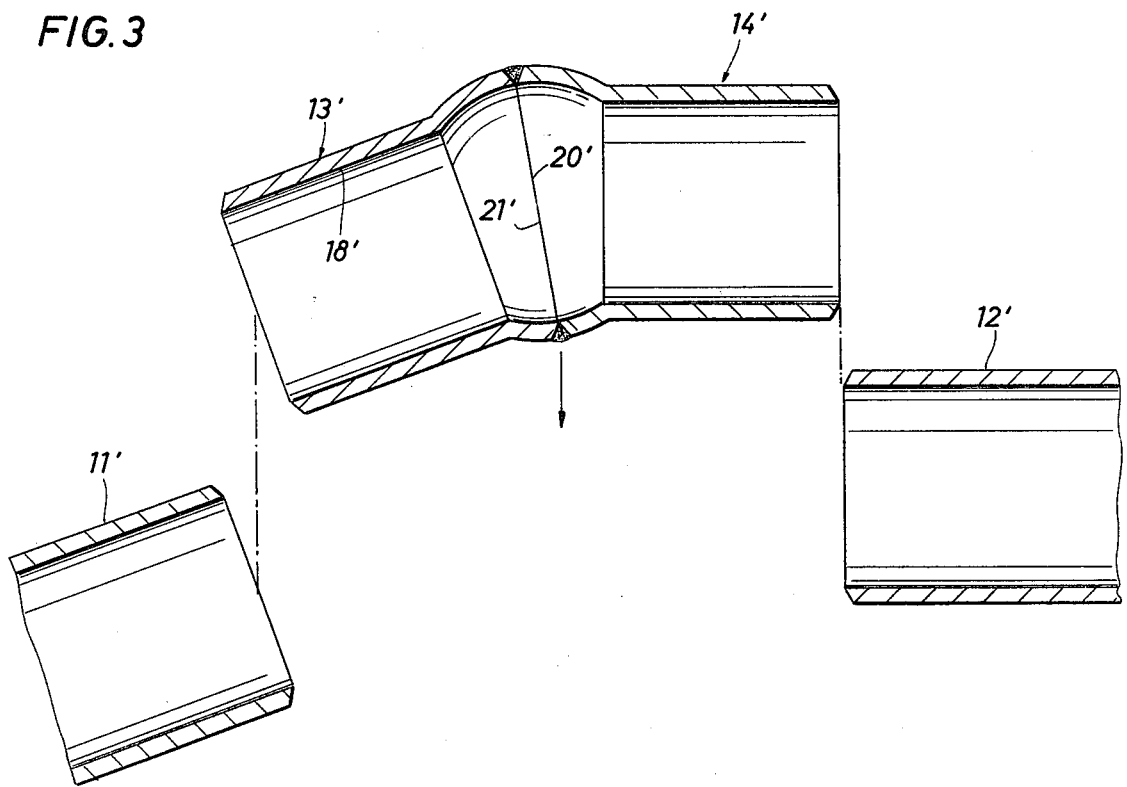
FIG. 3 is a longitudinal central sectional view of an alternate embodiment of the invention, showing the coupling members positioned for insertion between the pipe ends.
Figure 4:
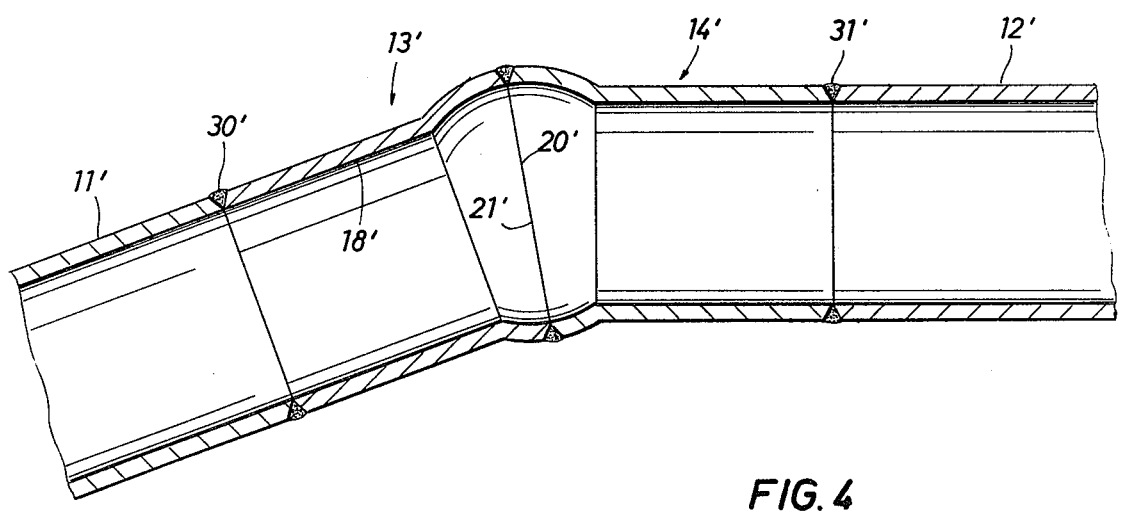
FIG. 4 is a view similar to FIG. 3, but showing the coupling members welded in place.

Referring to FIGS. 3 and 4, an alternate embodiment of the invention is shown wherein the coupling members 13' and 14' are butt welded directly to the ends of pipes 11' and 12', without the use of tubes 15 and 16. Coupling members 13' and 14' of the alternate embodiment are substantially identical to coupling numbers 13 and 14 of the preferred embodiment, except that the tubular portions 18' have inside and outside diameters substantially equal to those of pipes 11' and 12'. The faces 20' and 21' of coupling members 13' and 14' are abutted and rotated relative to each other until the axes of tubular portions 18' intersect at an angle which is equal to the angle at which the axes of pipes 11' and 12' intersect. When coupling members 13' and 14' are properly oriented, faces 20' and 21' are butt welded together. Coupling members 13' and 14' are then inserted between the ends of pipes 11 and 12 such that the axes of coupling members 13' and 14' coincide with axes of pipes 11' and 12' respectively, and then are butt welded at weldments 30' and 31'.

The method and apparatus of this invention may be practiced either in the atmosphere or under water. The required welds may be made by using any of a number of techniques known to those skilled in the art.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

I claim:

1. A pipe connection joining axially spaced apart relatively misaligned pipes, comprising:
   a pair of tubes, each of which has a radially outwardly enlarged ring near one end thereof, which end is butt welded to the end of one of said pipes;
   a pair of coupling members, each of which has a tubular portion telescopically mounted over one of said tubes, and each has an end portion having a face butt welded to the face of the other end portion, wherein each of said faces lies on a plane which intersects the axes of said tubular portions at a nonperpendicular angle and describes a circle upon said plane; and
   a pair of axially split sleeves, each of which is butt welded between one of said rings and the end of one of said tubes, wherein the split portions of each of said sleeves are butt welded together.

2. In a method of interconnecting the ends of two axially spaced apart and axially misaligned pipes, which pipes have axes which intersect at a point therebetween, the combination of steps comprising:
   forming a pair of coupling members, each of said coupling members having at one end thereof a tubular portion adapted for butt welding coaxially to one of said pipe ends, and each of said coupling members having at the other end thereof a radially enlarged spherical shaped portion having an end face which lies on a plane intersecting the axis of said tubular portion at a nonperpendicular angle and which describes a circle on said plane;
   supporting said coupling members coaxially between the ends of said pipes and in generally end to end relationship, with said end faces being generally proximate each other;
   rotating said coupling members relative to each other until the axes of said tubular portions intersect at an angle which is equal to the angle at which the axes of said pipes intersect;
   butt welding said end faces together;
   and butt welding said ends of said tubular portions to said pipes, said butt welding including forming a pair of tubes, each of which having a radially outwardly enlarged anchor ring near one end thereof; butt welding each one of said tubes generally coaxially to one of said pipes; sliding each of said coupling members over one of said tubes; forming a pair of axially split sleeves, each sleeve being adapted for installation over one of said tubes and to occupy the space between said end of said tubular portion and said anchor ring; and butt welding each of said sleeves between said end of tubular portion and said anchor ring.

3. In apparatus for connecting the ends of two axially spaced apart relatively misaligned pipes, the combination comprising:
   a pair of tubes each of which is capable of being butt welded at one end thereof to one of said pipe ends;
   a pair of coupling members, each having a tubular portion having an end portion with an annular face which lies on a plane which intersects the axis of said tubular portion at an angle not equal to 90° and which describes a circle upon said plane, each of said tubular portions being slidingly mountable over said tubes and rotatable thereabout until said faces of said end portions may be abutted to each other and welded together;

and means for fixing said coupling members upon said tubes, said means including a radially enlarged anchor ring formed near the welded end of said tube; and an axially split sleeve adapted to be fitted over said tubes and be butt welded at one end thereof to said anchor ring and at the other end thereof to the end of said tubular portion.

4. The invention as claimed in claim 3, wherein:
said anchor ring, said sleeve, and said tubular portion each being of substantially equal radial thickness.

* * * * *